United States Patent
Roeben et al.

(10) Patent No.: US 10,781,302 B2
(45) Date of Patent: Sep. 22, 2020

(54) RUBBER MIXTURES

(71) Applicant: EVONIK OPERATIONS GMBH, Essen (DE)

(72) Inventors: Caren Roeben, Essen (DE); Sascha Erhardt, Rheinfelden (DE)

(73) Assignee: EVONIK OPERATIONS GMBH, Essen (DE)

( * ) Notice: Subject to any disclaimer, the term of this patent is extended or adjusted under 35 U.S.C. 154(b) by 0 days.

(21) Appl. No.: 15/781,257

(22) PCT Filed: Nov. 28, 2016

(86) PCT No.: PCT/EP2016/079023
§ 371 (c)(1),
(2) Date: Jun. 4, 2018

(87) PCT Pub. No.: WO2017/097625
PCT Pub. Date: Jun. 15, 2017

(65) Prior Publication Data
US 2018/0346696 A1     Dec. 6, 2018

(30) Foreign Application Priority Data

Dec. 7, 2015 (DE) .......................... 10 2015 224 436

(51) Int. Cl.
*C08K 5/549*    (2006.01)
*C08J 3/24*    (2006.01)
*C08L 21/00*    (2006.01)

(52) U.S. Cl.
CPC .................. *C08L 21/00* (2013.01); *C08J 3/24* (2013.01); *C08K 5/549* (2013.01)

(58) Field of Classification Search
CPC ..................................... C08K 5/549; C08J 3/24
See application file for complete search history.

(56) References Cited

U.S. PATENT DOCUMENTS 9,090,730 B1   7/2015   Mazumdar et al.
9,109,103 B2*   8/2015   Ma ........................ C08F 212/08
2015/0148477 A1   5/2015   Ma et al.

FOREIGN PATENT DOCUMENTS

EP    2 875 967 A2    5/2015

OTHER PUBLICATIONS

International Search Report and Written Opinion dated Feb. 9, 2017 in PCT/EP2016/079023, 10 pages.
U.S. Appl. No. 12/159,942, filed Aug. 28, 2012, US 2009-0221751 A1, Hasse, A., et al.
U.S. Pat. No. 546,084, Dec. 14, 1976, U.S. Pat. No. 3,997,581, Pletka, H.-D., et al.
U.S. Pat. No. 730,726, Feb. 7, 1978, U.S. Pat. No. 4,072,701, Pletka, H.-D, et al.
U.S. Appl. No. 15/781,223, filed Jun. 4, 2018, Roeben, C., et al.

* cited by examiner

*Primary Examiner* — Vickey Nerangis
(74) *Attorney, Agent, or Firm* — Oblon, McClelland, Maier & Neustadt, L.L.P.

(57) ABSTRACT

The invention relates to rubber mixtures, wherein these comprise at least one rubber, excluding silicone rubber, and at least one silatrane of general formula (I)

$$G\text{-}Si(\text{---}O\text{---}CX^1X^2\text{---}CX^1X^3\text{---})_3N \qquad (I)$$

The rubber mixture is produced by mixing at least one rubber and a silatrane of formula (I).
The silatrane of formula (I) may be used as a secondary accelerator in rubber mixtures.

10 Claims, No Drawings

RUBBER MIXTURES

The present invention relates to rubber mixtures, to a process for the production thereof and to the use thereof.

U.S. Pat. No. 4,048,206 discloses the synthesis of compounds of general formula X'—Z'—Si(OR')$_3$N, wherein X' may=halogen, HS—, Z' may=bivalent hydrocarbon and R' may=—CH$_2$—CH$_2$— or —CH(CH$_3$)—CH$_2$—.

J. Gen. Chem. USSR (EN) 45(6), 1975, 1366 (Voronkov et al.) moreover discloses the synthesis of NCS—CH$_2$—Si(O—CH$_2$—CH$_2$)$_3$N and NCS—CH$_2$—CH$_2$—CH$_2$—Si(O—CH$_2$—CH$_2$)$_3$N by transesterification of the corresponding methoxysilanes with triethanolamine to release methanol.

Synthesis and Reactivity in Inorganic and Metal-Organic Chemistry (1987), 17(10), 1003-9 discloses alkylsilatranes.

EP 2 206 742 furthermore discloses silatrane-containing particles used as coupling agents between silica and rubber.

EP 0 919 558 discloses silane derivatives of formula R'''—Si(O—CR'R''—CR'R')$_3$N, wherein at least one R'' is an alkenyloxyalkyl group. These silane derivatives may be used in silicone compounds.

EP 1 045 006, EP 1 045 002 and EP 0 919 558 furthermore disclose silatranes for silicone rubber applications.

The use of diphenylguanidine as a secondary accelerator in silica-filled rubber mixtures is disclosed in various places in the literature (for example H.-D. Luginsland, A Review on the chemistry and reinforcement of the silica-silane filler system for rubber applications, Shaker, Aachen, 2002, p. 49).

The disadvantage of the known accelerator diphenylguanidine/guanidine derivatives is the release of toxic aniline/toxic derivatives of aniline during mixing.

The present invention has for its object the production of rubber mixtures with accelerators which do not release toxic aniline/derivatives of aniline.

The invention provides rubber mixtures which are characterized in that they comprise at least one rubber, excluding silicone rubber, and at least one silatrane of general formula (I)

$$G\text{-Si}(\text{—O—CX}^1\text{X}^2\text{—CX}^1\text{X}^3\text{—})_3\text{N} \qquad (I),$$

wherein G is a monovalent, unbranched or branched, saturated or unsaturated, aliphatic, aromatic or mixed aliphatic/aromatic (C$_2$-C$_8$)—, preferably (C$_2$-C$_6$)—, particularly preferably (C$_3$-C$_6$)—, very particularly preferably (C$_3$)—, hydrocarbon chain, X$^1$, X$^2$ and X$^3$ each independently of one another represent hydrogen (—H), straight-chain unsubstituted or branched unsubstituted (C$_1$-C$_{10}$)-alkyl-, preferably straight-chain unsubstituted or branched unsubstituted (C$_1$-C$_6$)-alkyl-, particularly preferably methyl or ethyl.

The rubber may preferably be a diene rubber.

G may preferably be CH$_3$CH$_2$CH$_2$—. X$^1$, X$^2$ and X$^3$ may preferably be H. The silatrane of general formula (I) may preferably be CH$_3$CH$_2$CH$_2$—Si(—O—CH$_2$—CH$_2$—)$_3$N.

Silatranes of general formula (I) may be mixtures of silatranes of general formula (I).

Silatranes of general formula (I) may be partly hydrolyzed compounds of silatranes of general formula (I).

Silatranes of general formula (I) may be:

CH$_3$—CH$_2$—Si(—O—CH$_2$—CH$_2$—)$_3$N,

CH$_3$—CH$_2$—CH$_2$—Si(—O—CH$_2$—CH$_2$—)$_3$N,

CH$_3$—CH(CH$_3$)—CH$_2$—Si(—O—CH$_2$—CH$_2$—)$_3$N,

CH$_3$—CH$_2$—Si(—O—CH(CH$_3$)—CH$_2$—)$_3$N,

CH$_3$—CH$_2$—CH$_2$—Si(—O—CH(CH$_3$)—CH$_2$—)$_3$N or

CH$_3$—CH(CH$_3$)—CH$_2$—Si(—O—CH(CH$_3$)—CH$_2$—)$_3$N.

The silatranes of formula (I) may be produced by reacting at least one compound of general formula (II)

$$G\text{-Si}(\text{—O-alk})_3 \qquad (II),$$

wherein G is as defined above and alk independently at each occurrence is (C$_1$-C$_{10}$)-alkyl, preferably methyl, ethyl or propyl, with compounds of general formula III $$(\text{HO—CX}^1\text{X}^2\text{—CX}^1\text{X}^3\text{—})_3\text{N} \qquad (III),$$

wherein X$^1$, X$^2$ and X$^3$ are as defined above, to eliminate alk-OH and removing alk-OH from the reaction mixture.

The reaction may may be effected with or without catalysis. The alk-OH may be removed from the reaction mixture in continuous or batchwise fashion.

Examples of compounds of general formula III may include: triethanolamine, triisopropanolamine and [HO—CH(phenyl)CH$_2$]$_3$N.

A low water content of the employed compounds of formula III may have an advantageous effect on the composition and the product properties of the compounds. The compounds of formula III may preferably have a water content of less than 1 wt %, particularly preferably of less than 0.2 wt %.

The reaction may be carried out in typical organic solvents having a boiling point of less than 200° C., preferably less than 100° C.

The reaction may be carried out in the absence of organic solvents.

Catalysts that may be employed in the process for producing silatranes of formula (I) are metal-free or metal-containing catalysts.

Metal-containing catalysts that may be employed include metal compounds of group 3-7, of group 13-14 and/or of the lanthanide group.

Metal-containing catalysts that may be employed include transition metal compounds.

The metal-containing catalysts may be metal compounds, for example metal chlorides, metal oxides, metal oxychlorides, metal sulphides, metal sulphochlorides, metal alkoxides, metal thiolates, metal oxyalkoxides, metal amides, metal imides or transition metal compounds comprising multiple bound ligands.

Metal-containing catalysts that may be employed include for example titanium alkoxides.

Catalysts that may be employed include in particular titanates, for example tetra-n-butyl orthotitanate, tetraethyl orthotitanate, tetra-n-propyl orthotitanate or tetraisopropyl orthotitanate.

Metal-free catalysts that may be employed include organic acids.

Organic acids that may be employed include for example trifluoroacetic acid, trifluoromethanesulphonic acid or p-toluenesulphonic acid, trialkylammonium compounds R$_3$NH$^+$X$^-$ or organic bases, for example trialkylamines NR$_3$.

The production process may be carried out at atmospheric pressure or reduced pressure, preferably between 1 and 600 mbar, particularly preferably between 5 and 200 mbar.

The production process may be carried out in the temperature range between 20° C. and 200° C., preferably between 35° C. and 150° C.

It is possible to add to the reaction mixture before or during the reaction substances promoting water transport out of the product by formation of azeotropic mixtures. The relevant substances may be cyclic or straight-chain aliphatics, aromatics, mixed aromatic-aliphatic compounds, ethers, alcohols or acids. Hexane, cyclohexane, benzene, toluene, ethanol, propanol, isopropanol, butanol, ethylene glycol, tetrahydrofuran, dioxane, formic acid, acetic acid, ethyl acetate or dimethylformamide may be employed for example.

To avoid condensation reactions it may the advantageous to carry out the reaction in a water-free environment, ideally in an inert gas atmosphere.

The silatranes of formula (I) may be used as accelerators in filled rubber mixtures, for example tyre treads.

The silatranes of general formula (I) may be employed in amounts of 0.1 to 8 parts by weight, preferably 0.2 to 6 parts by weight, particularly preferably 0.8 to 4 parts by weight, based on 100 parts by weight of the employed rubber.

The present invention further provides a process for producing the rubber mixtures according to the invention which is characterized in that it comprises mixing at least one rubber and a silatrane of formula (I).

The rubber mixture may comprise at least one filler.

The addition of the silatranes of general formula (I) and the addition of the fillers may be effected at material temperatures of 100° C. to 200° C. However said addition may also be effected at lower temperatures of 40° C. to 100° C., for example together with further rubber auxiliaries.

The silatranes of general formula (I) may be added to the mixing process either in pure form or else applied to an inert organic or inorganic carrier or prereacted with an organic or inorganic carrier. Preferred carrier materials may be precipitated or pyrogenic silicas, waxes, thermoplastics, natural or synthetic silicates, natural or synthetic oxides, preferably aluminium oxide, or carbon blacks. The silatranes may also be added to the mixing process prereacted with the filler to be employed.

Fillers employable for the inventive rubber mixtures include the following fillers:

Carbon blacks: The carbon blacks to be used here may be produced by the lamp black process, furnace black process, gas black process or thermal black process. The carbon blacks may have a BET surface area of 20 to 200 $m^2/g$. The carbon blacks may optionally also be doped, for example with Si.

Amorphous silicas, preferably precipitated silicas or pyrogenic silicas. The amorphous silicas may have a specific surface area of 5 to 1000 $m^2/g$, preferably 20 to 400 $m^2/g$ (BET surface area) and a primary particle size of 10 to 400 nm. The silicas may optionally also be in the form of mixed oxides with other metal oxides, such as oxides of Al, Mg, Ca, Ba, Zn and titanium.

Synthetic silicates, such as aluminium silicate or alkaline earth silicates, for example magnesium silicate or calcium silicate. The synthetic silicates having BET surface areas of 20 to 400 $m^2/g$ and primary particle diameters of 10 to 400 nm.

Synthetic or natural aluminium oxides and hydroxides.

Natural silicates, such as kaolin and other naturally occurring silicas.

Glass fibres and glass-fibre products (mats, strands) or glass microbeads.

It is preferably possible to employ amorphous silicas, particularly preferably precipitated silicas or silicates, especially preferably precipitated silicas having a BET surface area of 20 to 400 $m^2/g$ in amounts of 5 to 180 parts by weight in each case based on 100 parts of rubber.

The recited fillers may be used alone or in admixture. In a particularly preferred embodiment of the process 10 to 180 parts by weight of fillers, preferably precipitated silicas, optionally together with 0 to 100 parts by weight of carbon black, and 0.1 to 8 parts by weight of silatranes of general formula I in each case based on 100 parts by weight of rubber may be employed to produce the mixtures.

Synthetic rubbers as well as natural rubber are suitable for producing the rubber mixtures according to the invention. Preferred synthetic rubbers are described for example in W. Hofmann, Kautschuktechnologie [Rubber Technology], Genter Verlag, Stuttgart 1980. These include inter alia polybutadiene (BR), polyisoprene (IR), styrene/butadiene copolymers, for example emulsion SBR (E-SBR) or solution SBR (S-SBR), preferably having a styrene content of 1 to 60 wt %, particularly preferably 2 to 50 wt %, based on the overall polymer, chloroprene (CR), isobutylene/isoprene copolymers (IIR), butadiene/acrylonitrile copolymers, preferably having an acrylonitrile content of 5 to 60 wt %, preferably 10 to 50 wt %, based on the overall polymer (NBR), partly hydrogenated or fully hydrogenated NBR rubber (HNBR), ethylene/propylene/diene copolymers (EPDM) or abovementioned rubbers additionally comprising functional groups, for example carboxyl, silanol or epoxy groups, for example epoxidized NR, carboxyl-functionalized NBR or silanol(—SiOH)—/siloxy(—Si—OR)-functionalized, amino-, epoxy-, mercapto-, hydroxyl-functionalized SBR, and mixtures of these rubbers. Of interest for the production of automobile tyre treads are in particular anionically polymerized S-SBR rubbers (solution SBR) having a glass transition temperature above −50° C. and mixtures thereof with diene rubbers.

The rubber vulcanizates according to the invention may comprise further rubber auxiliaries, such as reaction accelerators, antioxidants, heat stabilizers, light stabilizers, antiozonants, processing aids, plasticizers, resins, tackifiers, blowing agents, dyes, pigments, waxes, extenders, organic acids, retarders, metal oxides and also activators, such as diphenylguanidine, triethanolamine, polyethylene glycol, alkoxy-terminated polyethylene glycol alkyl-O—($CH_2$—$CH_2$—O)$_{y'}$—H where $y'=2$-25, preferably $y'=2$-15, particularly preferably $y'=3$-10, very particularly preferably $y'=3$-6, or hexanetriol, that are familiar to the rubber industry.

The rubber auxiliaries may be used in familiar amounts determined inter alia by factors including the intended use. Customary amounts may for example be amounts of 0.1 to 50 wt % based on rubber. Crosslinkers that may be employed are peroxides, sulphur or sulphur-donor substances. The rubber mixtures according to the invention may moreover comprise vulcanization accelerators. Examples of suitable vulcanization accelerators may include mercaptobenzothiazoles, sulphenamides, thiurams, dithiocarbamates, thioureas and thiocarbonates. The vulcanization accelerators and sulphur may be employed in amounts of 0.1 to 10 wt %, preferably 0.1 to 5 wt %, based on 100 parts by weight of rubber.

The vulcanization of the inventive rubber mixtures may be effected at temperatures of 100° C. to 200° C., preferably 120° C. to 180° C., optionally at a pressure of 10 to 200 bar. The blending of the rubbers with the filler, any rubber auxiliaries and the silatranes may be carried out in customary mixing units, such as rollers, internal mixers and mixing extruders.

The rubber mixtures according to the invention may be used for producing moulded articles, for example for producing pneumatic tyres, tyre treads, cable sheathings, hoses, drive belts, conveyor belts, roller coverings, tyres, shoe soles, sealing rings and damping elements.

The rubber mixtures according to the invention may be carried out without the addition of guanidines. In a preferred embodiment the rubber mixture may be free from guanidine derivatives, preferably diphenylguanidine.

The silatranes of general formula (I) may be employed as secondary accelerators. This makes it possible to partly or completely eschew the use of guanidine accelerators.

The invention further provides for the use of silatranes of general formula (I)

$$G-Si(-O-CX^1X^2-CX^1X^3-)_3N \quad (I),$$

wherein G is a monovalent, unbranched or branched, saturated or unsaturated, aliphatic, aromatic or mixed aliphatic/aromatic $(C_2-C_8)$—, preferably $(C_2-C_6)$—, particularly preferably $(C_3-C_6)$—, very particularly preferably $(C_3)$—, hydrocarbon chain, $X^1$, $X^2$ and $X^3$ each independently of one another represent hydrogen (—H), straight-chain unsubstituted or branched unsubstituted $(C_1-C_{10})$-alkyl-, preferably straight-chain unsubstituted or branched unsubstituted $(C_1-C_6)$-alkyl-, particularly preferably methyl or ethyl, in rubber mixtures as a secondary accelerator.

The rubber mixtures according to the invention have the advantage that compared to the known guanidine accelerators said mixtures do not release any toxic aniline/derivatives of aniline during mixture production and/or vulcanization and in rubber mixtures without DPG exhibit longer incubation times (t10, t20) increased crosslinking density and a lower Mooney viscosity.

EXAMPLES

The raw materials used for the examples are: triethanolamine from BASF SE, isobutyltriethoxysilane, hexadecyltrimethoxysilane, octyltriethoxysilane and propyltriethoxysilane from Evonik Industries AG, sodium hydroxide and phenyltrimethoxysilane from Sigma-Aldrich, ethanol and methanol from Sasol Solvents Germany GmbH, trimethoxymethylsilane from Merck and n-hexane and n-pentane from VWR.

Comparative Example 1: (1-methyl-2,8,9-trioxa-5-aza-1-silabicyclo[3.3.3]undecane; 1-methylsilatrane)

A round-bottomed flask fitted with a stirring apparatus (KPG stirrer) and a reflux cooler is initially charged under a nitrogen atmosphere with 193.94 g of triethanolamine, 177.09 g of trimethoxymethylsilane, 500 ml of methanol and 0.52 g of sodium hydroxide with stirring. The reaction mixture is heated to 36° C. for 18 hours, the product precipitating as a solid. The mixture is concentrated under vacuum at 40° C. on a rotary evaporator and then separated from residual methanol by means of a pressure filtration and dried under vacuum. 241.52 g of 1-methylsilatrane are obtained as a white, finely crystalline solid in a yield of 98%.

The product has a melting range of 146-171° C. and according to $^1$H NMR analysis comprises 94.2 wt % of 1-methylsilatrane.

Example 1: (1-propyl-2,8,9-trioxa-5-aza-1-silabicyclo[3.3.3]undecane; 1-propylsilatrane)

A round-bottomed flask fitted with a stirring apparatus (KPG stirrer) and a reflux cooler is initially charged under a nitrogen atmosphere with 183.5 g of triethanolamine, 253.81 g of propyltriethoxysilane, 500 ml of ethanol and 4.8 g of sodium hydroxide with stirring. The reaction mixture is heated to 68° C. for 12 h. After cooling to room temperature the reflux cooler is replaced by a distillation bridge. Ethanol is subsequently removed at 78° C. and atmospheric pressure, a sufficient amount being left behind to ensure that the mixture remains stirrable. The product is precipitated fully with pentane and separated from residual ethanol and pentane by means of a pressure filtration. The filtercake is dried under vacuum. 267.33 g of 1-propylsilatrane are obtained as a white, crystalline solid in a yield of 78%.

The product has a melting point of 85° C. and according to analysis by $^1$H NMR spectroscopy has a purity of >99 wt %.

Example 2: (1-octyl-2,8,9-trioxa-5-aza-1-silabicyclo[3.3.3]undecane; 1-octylsilatrane)

A round-bottomed flask fitted with a stirring apparatus (KPG stirrer) and a reflux cooler is initially charged under a nitrogen atmosphere with 134.3 g of triethanolamine, 256.5 g of octyltriethoxysilane, 400 ml of ethanol and 3.56 g of sodium hydroxide with stirring. The reaction mixture is heated to 80° C. for 24 h. After cooling to room temperature the reaction mixture is concentrated under reduced pressure at 40° C. on a rotary evaporator. The product is precipitated fully by addition of pentane and separated from residual ethanol and pentane by means of a pressure filtration. The filtercake is dried under vacuum. 186.8 g of 1-octylsilatrane are obtained as a beige powder in a yield of 71%.

The product has a melting range of 69° C. and according to $^1$H NMR analysis comprises 98.4 wt % of 1-octylsilatrane.

Comparative Example 2: (1-hexadecyl-2,8,9-trioxa-5-aza-1-silabicyclo[3.3.3]undecane; 1-hexadecylsilatrane)

A round-bottomed flask fitted with a stirring apparatus (KPG stirrer) and a reflux cooler is initially charged under a nitrogen atmosphere with 90.0 g of triethanolamine, 208.0 g of hexadecyltriethoxysilane, 900 ml of methanol and 2.39 g of sodium hydroxide with stirring. The reaction mixture is heated to 36° C. for 16 h. After cooling to room temperature the reaction mixture is concentrated under reduced pressure at 40° C. on a rotary evaporator. The product is precipitated fully by addition of n-hexane and separated from residual methanol and hexane by means of a pressure filtration. The filtercake is dried under vacuum. 159.8 g of 1-hexadecylsilatrane are obtained as a white, finely crystalline solid in a yield of 66%.

The product has a melting range of 79° C. and according to $^1$H NMR analysis comprises 99.8 wt % of 1-hexadecylsilatrane.

Example 3: (1-isobutyl-2,8,9-trioxa-5-aza-1-silabicyclo[3.3.3]undecane; isobutylsilatrane)

A round-bottomed flask fitted with a stirring apparatus (KPG stirrer) and a reflux cooler is initially charged under a nitrogen atmosphere with 203.1 g of triethanolamine, 300.0 g of isobutyltriethoxysilane, 500 ml of ethanol and 5.68 g of sodium hydroxide with stirring. The reaction mixture is heated to boiling point for 16 h. After cooling to room temperature the reaction mixture is concentrated under reduced pressure at 40° C. on a rotary evaporator. To ensure complete removal of ethanol the product is melted and dried under vacuum at 70° C. 314.6 g of 1-isobutylsilatrane are obtained as yellow solid in a yield of 100%.

The product has a melting point of 55° C. and according to $^1$H NMR analysis comprises 96.0 wt % of 1-isobutylsilatrane.

Example 4: (1-phenyl-2,8,9-trioxa-5-aza-1-silabicyclo[3.3.3]undecane; 1-phenylsilatrane)

A round-bottomed flask fitted with a stirring apparatus (KPG stirrer) and a reflux cooler is initially charged under a nitrogen atmosphere with 134.3 g of triethanolamine, 178.5 g of phenyltrimethoxysilane, 900 ml of methanol and 3.62 g of sodium hydroxide with stirring. The reaction mixture is heated to 36° C. for 4 h. After cooling to room temperature the reaction mixture is slurried with n-hexane and filtered. The filtercake is dried under vacuum. 208.0 g of 1-phenylsilatrane are obtained as a white, coarsely crystalline solid in a yield of 92%.

The product has a melting point of 205° C. and according to $^1$H NMR analysis comprises 94.4 wt % of 1-phenylsilatrane.

Example 5: Rubber Tests

The formulation used for the rubber mixtures is specified in Table 1 below. The unit phr means parts by weight based on 100 parts of the crude rubber employed. The silatranes are employed in equimolar amounts, i.e. the amount of substance is equal.

The following secondary accelerators are being investigated:

In comparative mixture 1: N,N'-diphenylguanidine (DPG-80).

In comparative mixture 2: mixture without secondary accelerator.

In comparative mixture 3: silatrane according to comparative example 1.

In inventive mixture 4: silatrane according to example 1.
In inventive mixture 5: silatrane according to example 2.
In comparative mixture 6: silatrane according to comparative example 2.
In inventive mixture 7: silatrane according to example 3.
In inventive mixture 8: silatrane according to example 4.

TABLE 1

| | comparative mixture 1 (phr) | comparative mixture 2 (phr) | comparative mixture 3 (phr) | mixture 4 (phr) | mixture 5 (phr) | comparative mixture 6 (phr) | mixture 7 (phr) | mixture 8 (phr) |
|---|---|---|---|---|---|---|---|---|
| stage 1 | | | | | | | | |
| Buna VSL 4526-2$^a$ | 96.3 | 96.3 | 96.3 | 96.3 | 96.3 | 96.3 | 96.3 | 96.3 |
| Buna CB 24$^b$ | 30.0 | 30.0 | 30.0 | 30.0 | 30.0 | 30.0 | 30.0 | 30.0 |
| ULTRASIL ® 7000 GR$^c$ | 80.0 | 80.0 | 80.0 | 80.0 | 80.0 | 80.0 | 80.0 | 80.0 |
| Si 266 ®$^d$ | 5.8 | 5.8 | 5.8 | 5.8 | 5.8 | 5.8 | 5.8 | 5.8 |
| Corax ® N 330$^e$ | 5.0 | 5.0 | 5.0 | 5.0 | 5.0 | 5.0 | 5.0 | 5.0 |
| ZnO$^f$ | 2.0 | 2.0 | 2.0 | 2.0 | 2.0 | 2.0 | 2.0 | 2.0 |
| fatty acid$^g$ | 2.0 | 2.0 | 2.0 | 2.0 | 2.0 | 2.0 | 2.0 | 2.0 |
| Vivatec 500$^h$ | 8.8 | 8.8 | 8.8 | 8.8 | 8.8 | 8.8 | 8.8 | 8.8 |
| Protektor G 3108$^i$ | 2.0 | 2.0 | 2.0 | 2.0 | 2.0 | 2.0 | 2.0 | 2.0 |
| Vulkanox ® 4020/LG$^j$ | 2.0 | 2.0 | 2.0 | 2.0 | 2.0 | 2.0 | 2.0 | 2.0 |
| Vulkanox ® HS/LG$^k$ | 1.5 | 1.5 | 1.5 | 1.5 | 1.5 | 1.5 | 1.5 | 1.5 |
| Rhenogran ® DPG-80$^l$ | 2.5 | | | | | | | |
| comparative example 1 | | | 1.7 | | | | | |
| example 1 | | | | 2.0 | | | | |
| example 2 | | | | | 2.6 | | | |
| comparative example 2 | | | | | | 3.7 | | |
| example 3 | | | | | | | 2.1 | |
| example 4 | | | | | | | | 2.3 |
| stage 2 | | | | | | | | |
| stage 1 batch | | | | | | | | |
| stage 3 | | | | | | | | |
| stage 2 batch | | | | | | | | |
| Perkacit TBzTD$^m$ | 0.2 | 0.2 | 0.2 | 0.2 | 0.2 | 0.2 | 0.2 | 0.2 |

TABLE 1-continued

|  | comparative mixture 1 (phr) | comparative mixture 2 (phr) | comparative mixture 3 (phr) | mixture 4 (phr) | mixture 5 (phr) | comparative mixture 6 (phr) | mixture 7 (phr) | mixture 8 (phr) |
|---|---|---|---|---|---|---|---|---|
| Vulkacit ® CZ/EG-C[n] | 1.6 | 1.6 | 1.6 | 1.6 | 1.6 | 1.6 | 1.6 | 1.6 |
| sulphur[o] | 2.0 | 2.0 | 2.0 | 2.0 | 2.0 | 2.0 | 2.0 | 2.0 |

Substances used:
[a]Buna VSL 4526-2: solution-polymerized SBR copolymer from Lanxess AG (slyrene content = 26 wt %, vinyl content = 44.5 wt %, TDAE oil content = 27.3 wt %, Mooney viscosity (ML 1 + 4/100° C.) = 50 MU).
[b]Buna CB 24: solution-polymerized high cis-1,4 poly butadiene (neodymium catalyst) from Lanxess AG (cis-1,4 content = min. 96%, Mooney viscosity (ML 1 + 4/100° C.) 44 MU).
[c]Silica: ULTRASIL ® 7000 GR from Evonik Industries AG (easily dispersible precipitated silica, BET surface area = 170 m$^2$/g, CTAB surface area = 160 m$^2$/g).
[d]Si 266 ®: bis(triethoxysilylpropyl)disulphide from Evonik Industries AG.
[e]Corax ® N 330: carbon black from Orion Engineered Carbons GmbH.
[f]ZnO: RS RAL 844 C ZnO zinc oxide from Arnsperger Chemikalien GmbH
[g]EDENOR ST1 fatty acid mixture ($C_{16}/C_{18}$) from Caldic Deutschland Chemie B.V.
[h]Vivatec 500: TDAE oil from H&R AG.
[i]Protektor G3108: antiozonant wax composed of refined hydrocarbons (freezing point = 57° C.) from Paramelt B.V.
[j]Vulkanox ® 4020/LG: N-(1,3-dimethylbutyl)-N'-phenyl-p-phenylenediamine (6 PPD) from Rhein Chemie Rheinau GmbH.
[k]Vulkanox ® HS/LG: polymeric 2,2,4-trimethyl-1,2-dihydroquinoline (TMQ) from Rhein Chemie Rheinau GmbH.
[l]Rhenogran ® DPG-80: 80% N,N'-diphenylguamdine (DPG) on 20% elastomeric carrier and dispersant from Rhein Chemie Rheinau GmbH.
[m]Perkacit TBzTD: tetrabenzylthiuram disulphide (TBzTD) obtained from Weber & Schaer (producer: Dalian Richon).
[n]Vulkacit ® CZ/EG-C: N-cyclohexyl-2-benzothiazolesulphenamide from Rhein Chemie Rheinau GmbH.
[o]sulphur: Mahbchwefel 80/90° from Solvay & CPC Barium Slrontium GmbH & Co.KG.

The mixtures are prepared in three stages in a 1.5 L internal mixer (E-type) at a batch temperature of 155° C. in accordance with the mixing instructions in Table 2.

The general process for preparing rubber mixtures and vulcanizates thereof is described in the book: "Rubber Technology Handbook", W. Hofmann, Hanser Verlag 1994.

TABLE 2

| stage 1 | |
|---|---|
| settings | |
| mixing unit | HF mixing group GmbH; type GK 1.5 E |
| fill level | 0.65 |
| speed of rotation | 80 rpm |
| ram pressure | 5.5 bar |
| flow temp. | 80° C. |
| mixing procedure | |
| 0 to 0.5 min | rubbers |
| 0.5 to 1.0 min | 6 PPD, TMQ |
| 1.0 to 2.0 min | ½ of silica, Si 266, ZnO, fatty acid |
| 2.0 min | vent and purge |
| 2.0 to 3.0 min | ½ of silica, carbon black, TDAE oil, if present: DPG-80 or silatrane, antiozonant wax |
| 3.0 min | vent |
| 3.0 to 5.0 min | mix at 155° C., optionally adjusting temperature by varying rotational speed |
| 5.0 min | discharge batch and form milled sheet on laboratory mixing roll mill for 45 s (laboratory roll mill: diameter 250 mm, length 190 mm, roll gap 4 mm, flow temperature 60° C.) 23 h storage at room temperature |
| stage 2 | |
| settings | |
| mixing unit | as in stage 1 except |
| fill level | 0.62 |
| speed of rotation | 95 rpm |
| flow temp. | 90° C. |
| mixing procedure | |
| 0 to 1.0 min | break up stage 1 batch |
| 1.0 to 3.0 min | mix at 155° C., optionally adjusting temperature by varying rotational speed |
| 3.0 min | discharge batch and form milled sheet on laboratory mixing roll mill for 45 s (laboratory roll mill: diameter 250 mm, length 190 mm, roll gap 4 mm, flow temperature 60° C.) 3 h storage at room temperature |
| stage 3 | |
| settings | |
| mixing unit | as in stage 1 except |
| fill level | 0.59 |
| speed of rotation | 55 rpm |
| flow temp. | 50° C. |
| mixing procedure | |
| 0 to 2.0 min | break up stage 2 batch, accelerator and sulphur, mix at 100° C., optionally adjusting temperature by varying rotational speed |
| 2.0 min | discharge batch and form milled sheet on laboratory mixing roll mill for 20 s (laboratory roll mill: diameter 250 mm, length 190 mm, roll gap 4 mm, flow temperature 80° C.) |

Vulcanization is effected at a temperature of 165° C. in a typical vulcanizing press with a holding pressure of 120 bar after $t_{95\%}$. The $t_{95\%}$ time is determined by means of a moving die rheometer (rotorless vulcameter) as per ISO 6502 (section 3.2 "rotorless curemeter") at 165° C.

Rubber testing is effected in accordance with the test methods specified in Table 3.

TABLE 3

| physical testing | standard/conditions |
|---|---|
| Mooney viscosity ML 1 + 4 at 100° C. Mooney viscosity/MU | ISO 289-1 |
| moving die rheometer (MDR) at 145° C., 1.67 Hz, 0.5° = 7% $t_{10}$/min $t_{20}$/min | ISO 6502, section 3.2 "rotorless curemeter" |
| rubber process analyzer (RPA) at 165° C., 1.67 Hz, 3° = 42% Δ torque ($M_{max}$ − $M_{min}$)/dNm | ISO 6502, section 3.2 "rotorless curemeter" |
| DIN abrasion, 10N abrasion/mm$^3$ | ISO 4649 |
| ball rebound 23° C. rebound resilience/% | DIN EN ISO 8307 fall height 500 mm, steel ball d = 19 mm, 28 g |

Table 4 reports the rubber data for the crude mixtures and vulcanizates.

TABLE 4

| | comparative mixture 1 | comparative mixture 2 | comparative mixture 3 | mixture 4 | mixture 5 | comparative mixture 6 | mixture 7 | mixture 8 |
|---|---|---|---|---|---|---|---|---|
| crude mixture results: Mooney viscosity ML 1 + 4 at 100° C. Mooney viscosity/MU | | | | | | | | |
| stage 1 | 94 | 100 | 89 | 82 | 78 | 73 | 82 | 82 |
| stage 2 | 64 | 79 | 69 | 67 | 67 | 64 | 67 | 68 |
| moving die rheometer (MDR) at 145° C., 1.67 Hz, 0.5° = 7% | | | | | | | | |
| $t_{10}$/min | 13.0 | 11.5 | 17.3 | 18.2 | 20.0 | 20.5 | 18.8 | 17.7 |
| $t_{20}$/min | 14.6 | 15.4 | 20.3 | 20.8 | 22.3 | 22.7 | 21.3 | 20.6 |
| rubber process analyzer (RPA) 165° C., 1.67 Hz, 3° = 42% | | | | | | | | |
| Δ torque ($M_{max} - M_{min}$)/dNm | 33.5 | 27.8 | 35.5 | 37.9 | 37.9 | 38.5 | 37.6 | 37.8 |
| vulcanizate results: | | | | | | | | |
| DIN abrasion, 10N abrasion/mm³ | 113 | 109 | 117 | 113 | 113 | 131 | 116 | 118 |
| ball rebound at 23° C. rebound resilience/% | 41.3 | 39.8 | 40.1 | 38.6 | 38.5 | 39.2 | 38.8 | 37.5 |

Compared to comparative mixture 2 the effect of the secondary accelerators is evidenced in all other mixtures by increased crosslinking yields (Δ torque ($M_{max}-M_{min}$)), improved processing (Mooney viscosities) and improved processing consistency ($t_{10}$ and $t_{20}$ values). The crosslinking yield of the inventive mixtures 4, 5, 7 and 8 and comparative mixture 6 is likewise improved compared to comparative mixture 1 which comprises the standard secondary accelerator DPG and compared to comparative mixture 3. Processing (Mooney viscosities) and processing consistency ($t_{10}$ and $t_{20}$ values) for the inventive mixtures 4, 5, 7 and 8 and the comparative mixture 6 is further improved compared to comparative mixture 3 which comprises the silatrane according to comparative example 1.

By contrast, the comparative mixture 6 shows weaknesses in terms of abrasion (DIN abrasion) compared to the inventive mixtures 4, 5, 7 and 8.

Compared to all comparative mixtures the inventive mixtures 4, 5, 7 and 8 show advantages in terms of wet adhesion (ball rebound at 23° C.) compared to the comparative mixtures 1, 2, 3 and 6.

The invention claimed is:

1. A process for producing a rubber article, the process comprising subjecting at least one rubber composition, excluding silicone rubber, comprising a synthetic rubber, a natural rubber, or both to vulcanization in the presence of at least one accelerator comprising at least one silatrane of formula (I):

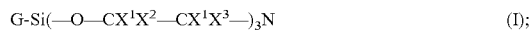

at least one of a silica, a carbon black, or mixtures thereof;
at least one treated distillate aromatic extract oil; and
at least one fatty acid, wherein:
G is a monovalent, unbranched or branched, saturated or unsaturated, aliphatic, aromatic or mixed aliphatic/aromatic ($C_2$-$C_8$)-hydrocarbon chain; and
$X^1$, $X^2$ and $X^3$ each independently of one another represent hydrogen (—H), or a straight-chain unsubstituted or branched unsubstituted ($C_1$-$C_{10}$)-alkyl-.

2. The process according to claim 1, wherein the silatrane of formula (I) is:

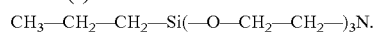

3. The process according to claim 1, wherein the at least one silatrane of formula (I) is present in an amount of 0.1 to 8 parts by weight, based on 100 parts by weight of the at least one rubber.

4. The process according to claim 1, wherein the at least one rubber composition further comprises reaction accelerator, antioxidant, heat stabilizer, light stabilizer, antiozonant, processing aid, plasticizer, resin, tackifier, blowing agent, dye, pigment, wax, extender, organic acid, retarder, metal oxide, activator, or one or more combinations thereof.

5. The process according to claim 1, wherein the at least one rubber composition is free of guanidine derivatives.

6. The process according to claim 5, wherein the guanidine derivative is, diphenylguanidine.

7. The process according to claim 1, wherein vulcanization is conducted at a temperature of 100° C. to 200° C.

8. The process according to claim 1, wherein vulcanization is conducted at a temperature of 120° C. to 180° C.

9. The process according to claim 8, wherein vulcanization is conducted at a pressure of 10 to 200 bar.

10. The process according to claim 1, wherein the rubber article is selected from the group consisting of a pneumatic tire, a tire tread, a rubber-containing tire component, a cable sheathing, a hose, a drive belt, a conveyor belt, a roller covering, a shoe sole, a sealing ring and a damping element.

* * * * *